US012339970B2

(12) United States Patent
Huang

(10) Patent No.: US 12,339,970 B2
(45) Date of Patent: Jun. 24, 2025

(54) SECURE BOOT DEVICE, METHOD AND ELECTRONIC SYSTEM USING THE SAME

(71) Applicant: NUVOTON TECHNOLOGY CORPORATION, Hsinchu (TW)

(72) Inventor: Wen-Hung Huang, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 97 days.

(21) Appl. No.: 18/525,202

(22) Filed: Nov. 30, 2023

(65) Prior Publication Data

US 2024/0202342 A1 Jun. 20, 2024

(30) Foreign Application Priority Data

Dec. 19, 2022 (TW) ................................. 111148701

(51) Int. Cl.
*G06F 21/57* (2013.01)

(52) U.S. Cl.
CPC .................................. *G06F 21/575* (2013.01)

(58) Field of Classification Search
CPC .................................................... G06F 21/575
See application file for complete search history.

(56) References Cited

U.S. PATENT DOCUMENTS

2019/0392151 A1* 12/2019 Lee ........................ G06F 21/575
2024/0070284 A1* 2/2024 Orlando ................ G06F 21/575
2024/0070285 A1* 2/2024 Huang .................. G06F 21/575

FOREIGN PATENT DOCUMENTS

TW I728377 B 5/2021
WO WO-2020051355 A1 3/2020

* cited by examiner

*Primary Examiner* — Zahid Choudhury
(74) *Attorney, Agent, or Firm* — MUNCY, GEISSLER, OLDS & LOWE, P.C.

(57) ABSTRACT

A secure boot device includes a counter, a storage device and a comparator. The counter receives a clock. When the processor performs a verification of a firmware for the first time, the counter counts a first verification time taken by the processor to perform the verification of the firmware for the first time based on the clock to generate a first-time verification count value. When the processor performs the verification of the firmware for the non-first time, the counter counts a second verification time taken by the processor to perform the verification of the firmware at least once for the non-first time based on the clock to generate a count value. The storage device stores the first-time verification count value. The comparator is electrically connected to the counter and the storage device. When the processor performs the verification of the firmware for the non-first time, the comparator compares the count value with the first-time verification count value, and generates a comparison result. The comparison result is used to indicate whether the processor executes the firmware.

14 Claims, 3 Drawing Sheets

SECURE BOOT DEVICE, METHOD AND ELECTRONIC SYSTEM USING THE SAME

CROSS-REFERENCE TO RELATED APPLICATION

This application claims the priority from the TW Patent Application No. 111148701, filed on Dec. 19, 2022 and all contents of such TW Patent Application are included in the present disclosure.

BACKGROUND

1. Field of the Invention

The present disclosure relates to a secure boot technology, in particular to, a secure boot device and a method has low computational complexity and can prevent electronic systems from executing tampered firmware, and an electronic system using the above-mentioned secure boot device and the method.

2. Description of the Related Art

Confidential data may be stored in the electronic system, such as keys or encrypted game data, audio-visual data or application programs, that is, digital assets and so on. For example, game console can download game data and application programs. When the firmware is not tampered with, the verification, such as key verification, must be performed before the user plays the game. However, once the firmware is tampered with, the game console is cracked and there is no longer a secure mechanism. It means that the game console has been hacked, and the user can play the game without verification. It is even possible that game data and application program files are stolen, that is, engaging in piracy.

The existing secure mechanism verifies the hash value of at least one part of the firmware to confirm whether the firmware has been tampered with. Moreover, apart from tampering with the firmware, hackers may also use other attack manners, such as side-channel attacks or temperature attacks, to try to find confidential information in the electronic system when the electronic system is started. The existing secure mechanism may be a little insufficient. However, in order to obtain a more reliable and complete security mechanism, it may lead to a larger amount of calculations. The increased calculations not only result in the problem of extra energy consumption but also make the boot time longer so that user experience is not good. Consequently, there is a need to set another secure mechanism with low energy consumption and low computational load or low complexity circuit under the existing secure mechanism to prevent the electronic from performing tampered firmware or prevent the electronic system from being attacked.

SUMMARY

It can be understood from the above description that the technical problems to be solved in the present disclosure is how to set another secure mechanism with low energy consumption and low computational load or low complexity circuit under the existing secure mechanism to prevent the electronic from performing tampered firmware or prevent the electronic system from being attacked to enhance the security of the electronic system.

In order to solve the above-mentioned conventional problems, an embodiment of the present disclosure provides a secure boot device. The secure boot device comprises a counter, a storage device and a comparator. The counter receives a clock. When a processor performs the verification of the firmware for the first time, the counter counts the first verification time taken by the processor to perform the verification of the firmware for the first time based on the clock to generate a first-time verification count value. When the processor performs the verification of the firmware for the non-first time, the counter counts the second verification time taken by the processor to perform the verification of the firmware at least once for the non-first time based on the clock to generate a count value. The storage device is configured to store the first-time verification count value. The comparator is electrically connected to the counter and the storage device. When the processor performs the verification of the firmware for the non-first time, the comparator compares the count value and the first-time verification count value and generates a comparison result. The comparison result is configured to indicate whether the processor executes the firmware.

In order to solve the above-mentioned conventional problems, an embodiment of the present disclosure further provides an electronic system. The electronic system comprises the aforementioned secure boot device, the processor and another storage device for storing the firmware. The storage device for storing the firmware is electrically connected to the processor and the secure boot device.

In order to solve the above-mentioned conventional problems, an embodiment of the present disclosure further provides a secure boot method. The method comprises the following steps. When the processor performs the verification of the firmware for the first time, the first verification time taken by the processor to perform the verification of the firmware for the first time is counted based on the clock to generate the first-time verification count value. The first-time verification count value is stored in the storage device. When the processor performs the verification of the firmware for the non-first time, the verification time taken by the processor to perform the verification of the firmware at least once for the non-first time is counted based on the clock to generate the count value. The count value is compared with the first-time verification count value, and the comparison result is generated. The processor is indicated whether to execute the firmware based on the comparison result.

To sum up, the secure boot device, the method and the electronic system using the same provided by the embodiments of the present disclosure record the first time that it takes to perform the verification of the firmware for the first time when performing the verification of the firmware for the first time. The secure boot device, method and the electronic device using the same provided by the embodiments of the present disclosure record the second time that it takes to perform the verification of the firmware for the non-first time when performing the verification of the firmware for the non-first time. It is determined whether the firmware is tampered with or the electronic system is attacked to determine whether the firmware is performed via determining whether there is a significant difference between the first time and the second time. Thus, the reliability, stability and security of the electronic system are improved.

BRIEF DESCRIPTION OF THE DRAWINGS

In order to make the above-mentioned and other purposes, features, advantages and embodiments of the present disclosure more obvious and understandable, the accompanying drawings are described as follow.

DESCRIPTION OF THE PREFERRED EMBODIMENTS

In view of the above-mentioned technical problems to be solved, embodiments of the present disclosure provide a secure boot device, a method and an electronic system using the same to detect whether the time of the verification of the firmware varies during the boot process. In this way, it can be determined whether the electronic system is attacked or the firmware is tampered with, so that the security of the electronic system can be improved. Further, the secure boot device counts the time taken by the processor to perform the verification of the firmware for the first time based on the clock corresponding to the system main frequency to record the first-time verification count value. The first-time verification count value is associated with the time that it takes to verify the firmware for the first time. Next, the secure boot device also counts the time taken by the processor to perform the verification of the firmware at least once for the non-first time based on the clock corresponding to the system main frequency to obtain the count value when the processor performs the verification of the firmware for the non-first time. The count value is associated with the time that it takes to verify the firmware for the non-first time. It can be determined whether there is an abnormality during the secure boot process, for example, the electronic system is attacked or the firmware is tampered with, via comparing the first-time verification count value with the count value, that is, comparing the time that it takes to verify the firmware for the first time with the time that it takes to verify the firmware at least once for the non-first time.

In order to avoid the change or abnormality of the system main frequency, the clock corresponding to the auxiliary frequency may be used for another counting additionally. Therefore, in additional to further confirming whether the system main frequency is abnormal, the embodiments of the present disclosure can also improve the robustness of the secure mechanism. Therefore, the embodiments of the present disclosure can utilize the clock corresponding to the system main frequency and the clock corresponding to the auxiliary frequency to count the time taken by the processor to verify the firmware at least once to obtain two count values. Then, differences between the two count values and the corresponding two first-time verification count values is configured to determine whether the processor executes the firmware. In this way, once the system main frequency is replaced or the program is executed abnormally due to an attack during the secure boot period, for example, a certain secure boot verification step is skipped, but the program itself cannot judge that there is an error in the program process, the final confirmation before executing the firmware can be made via checking the times taken by the processor to verify the firmware.

Figure 1:
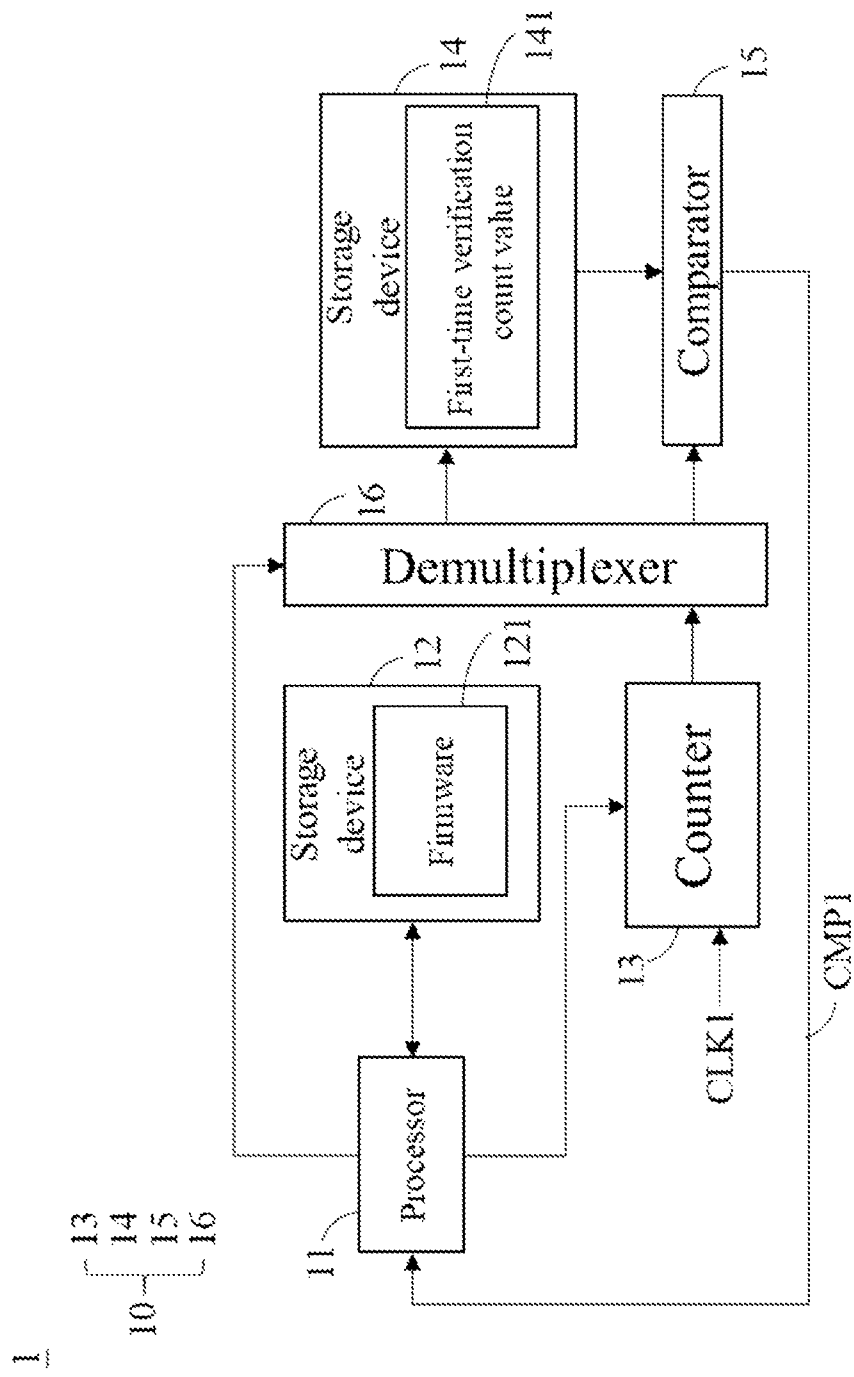
FIG. 1 is a block diagram of an electronic system using a secure boot device according to an embodiment of the present disclosure.

Please refer to FIG. 1, FIG. 1 is a block diagram of an electronic system using a secure boot device according to an embodiment of the present disclosure. The electronic system 1 comprises a secure boot device 10, a processor 11 and a storage device 12. The secure boot device 10 is electrically connected to the processor 11. The storage device 12 is electrically connected to the secure boot device 10. The secure boot device 10 is configured to check the time taken by the processor 11 to perform the verification of the firmware 121 stored in the storage device 12 to make confirmation before executing the firmware 121. Further, the secure boot device 10 comprises a counter 13, a storage device 14, a comparator 15 and a demultiplexer 16. The counter 13 is electrically connected to the processor 11 and the demultiplexer 16. The demultiplexer 16 is electrically connected to the processor 11, the storage device 14 and the comparator 15. The storage device 14 is electrically connected to the comparator 15 and the processor 11. The comparator 15 is electrically connected to the processor 11. Moreover, the electronic system 1 may be, for example, a server, a game console, a smartphone, a tablet, a desktop computer, a notebook computer, a smart wearable device, a processing equipment or a reaction equipment, and the present disclosure is not limited thereto.

When the processor 11 performs the verification of the firmware at the first time, for example, whenever the electronic system 1 restarts or leaves the factory, the processor 11 send a first-time verification instruction that the value is true. The counter 13 receives the clock CLK1 corresponding to the system main frequency, such as a reciprocal of the system main frequency or a multiple of the reciprocal of the system main frequency. The counter 13 counts the first verification time taken by the processor 11 to perform the verification of the firmware 121 for the first time based on the clock CLK1 to generate the first-time verification count value 141. In addition, the demultiplexer 16 transmits the received first-time verification count value 141 to the storage device 14 for storing based on the first-time verification instruction that the value is true. It should be noted that the storage device 12 and 14 may be the same storage device or difference storage devices, and the present disclosure is not limited thereto.

When the processor 11 performs the verification of the firmware 121 for the non-first time, the processor 11 sends a first-time verification instruction that the value is false. The counter 13 receives the clock CLK1. The counter 13 counts the second verification time taken by the processor 11 to perform the verification of the firmware 121 at least once for the non-first time based on the clock CLK1 to generate the count value. That is, the second verification time is the time taken by the processor 11 to perform the verification of the firmware 121 for the kth time. Besides, k is greater than or equal to 2. Alternatively, the second verification time is the time taken by the processor 11 to perform the verification of the firmware 121 from the kth time to the (k+n)th time. Besides, k is greater than or equal to 2, and k is greater than or equal to n. Furthermore, the demultiplexer 16 transmits the received count value to the comparator 15 based on the first-time verification instruction that the value is false.

Next, the comparator 15 compares the count value with the first-time verification count value 141 and generates the comparison result CMP1. The comparison result CMP1 is configured to instruct whether the processor 11 executes the firmware 121. Please note here that the following descriptions is taken that the second verification time is the time taken by the processor 11 to perform the verification of the firmware 121 for the non-first time as an example. When the count value is not quite different from the first-time verification count value 141, for example, the difference is less than a specific value, the comparison result CMP1 represents as true. The processor 11 is allowed to execute the firmware 121. Instead, when the count value is much different from the first-time verification count value 141, for example, the difference is greater than a specific value, the comparison result CMP1 represents as false. In this way, the processor 11 is not allowed to execute the firmware 121. Then, the following descriptions is taken that the second verification time is the time taken by the processor 11 to perform the verification of the firmware 121 for the non-first time for M times as an example. M is an integer greater than or equal to 2. When the count value is not much different from M times the first-time verification count value 141, for example, the difference is less than a specific value, the comparison result CMP1 represents as true. Then, the processor 11 is allowed to execute the firmware 121. Instead, when the count value is much different from M times the first-time verification count value 141, for example, the difference is greater than a specific value, the comparison result CMP1 represents as false. Then, the processor 11 is not allowed to execute the firmware 121. Simply speaking, each time for processor 11 to perform the verification of the firmware 121 should be little different from each other when the electronic system 1 is operated in a safe and stable situation. Therefore, whether the firmware 121 of the electronic system 1 is tampered with or the electronic system 1 is attacked can be determined via detecting the time taken by the processor 11 to perform the verification of the firmware 121.

Figure 2:
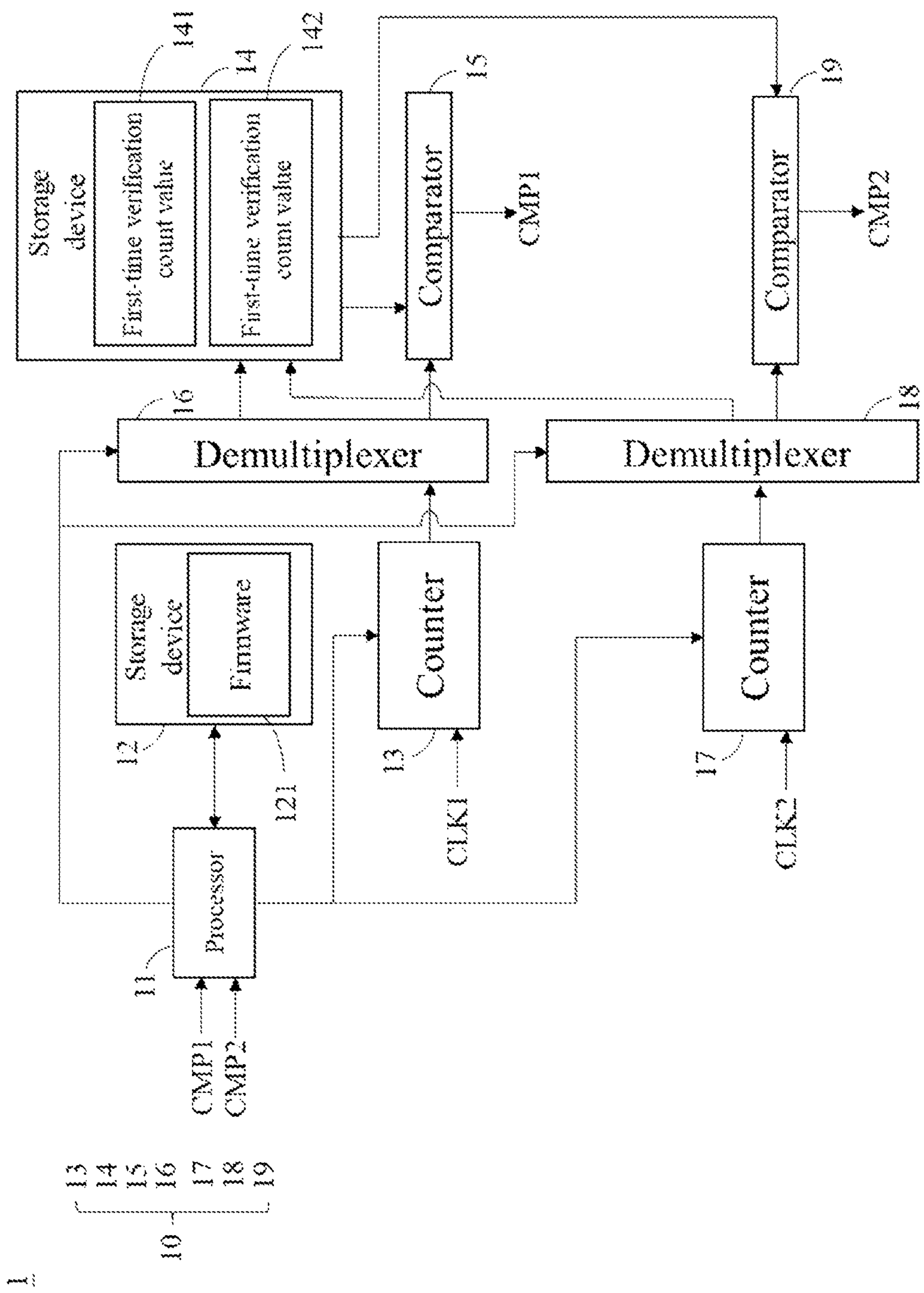
FIG. 2 is a block diagram of an electronic system using a secure boot device according to another embodiment of the present disclosure.

Next, please refer to FIG. 2, FIG. 2 is a block diagram of an electronic system using a secure boot device according to another embodiment of the present disclosure. In order to improve the robustness of the secure mechanism provided by the secure boot device 10, an embodiment of the present disclosure can prevent the system main frequency corresponding to the clock CLK1 from being replaced or prevent the secure boot device 10 from being attacked during the secure boot period to cause abnormal program execution. For example, a certain secure boot verification step is skipped, but the program itself cannot judge that there is an error in the program process. In the embodiment of FIG. 2, the clock CLK2 corresponding to the auxiliary frequency is additionally utilized for counting to solve the above-mentioned problems. In FIG. 2, the secure boot device 10 further comprises a counter 17, a demultiplexer 18 and a comparator 19. The counter 17 is electrically connected to the processor 11 and the demultiplexer 18. The demultiplexer 18 is electrically connected to the processor 11, the storage device 14 and the comparator 19. The comparator 19 is electrically connected to the processor 11.

When the processor 11 performs the verification of the firmware 121 for the first time, for example, whenever the electronic system 1 restarts or leaves the factory, the processor 11 send a first-time verification instruction that the value is true. The counter 17 receives the clock CLK2 corresponding to the auxiliary frequency, such as a reciprocal of the auxiliary frequency or a multiple of the reciprocal of the s auxiliary frequency. The counter 17 counts the first verification time taken by the processor 11 to perform the verification of the firmware 121 for the first time based on the clock CLK2 to generate the first-time verification count value 142. Additionally, the demultiplexer 18 transmits the received first-time verification count value 142 to the storage device 14 for storing based on the first-time verification instruction that the value is true. When the processor 11 performs the verification of the firmware 121 for the non-first time, the processor 11 sends a first-time verification instruction that the value is false. The counter 17 receives the clock CLK2. Then, the counter 17 counts the second verification time taken by the processor 11 to perform the verification of the firmware 121 at least once for the non-first time based on the clock CLK2 to generate the count value. Moreover, the demultiplexer 18 transmits the received count value to the comparator 19 based on the first-time verification instruction that the value is false.

Next, the comparator 19 compares the count value with the first-time verification value 142 and generates the comparison result CMP2. The comparison results CMP1 and CMP2 are configured to instruct whether the processor 11 executes the firmware 121. For example, both of the comparison results CMP1 and CMP2 are designed to represent that the two count values are much different from the first-time verification count values 141 and 142 respectively, that is, both of the comparison results CMP1 and CMP2 represent as false, and the processor 11 is not allowed to execute the firmware 121. Otherwise, the processor 11 executes the firmware 121. In another situation, both of the comparison results CMP1 and CMP2 are designed to represent that the two count values are not quite different from the first-time verification count values 141 and 142 respectively, that is, both of the comparison results CMP1 and CMP2 represent as true, the processor 11 is allowed to execute the firmware 121. Otherwise, the processor 11 does not execute the firmware 121.

Figure 3:
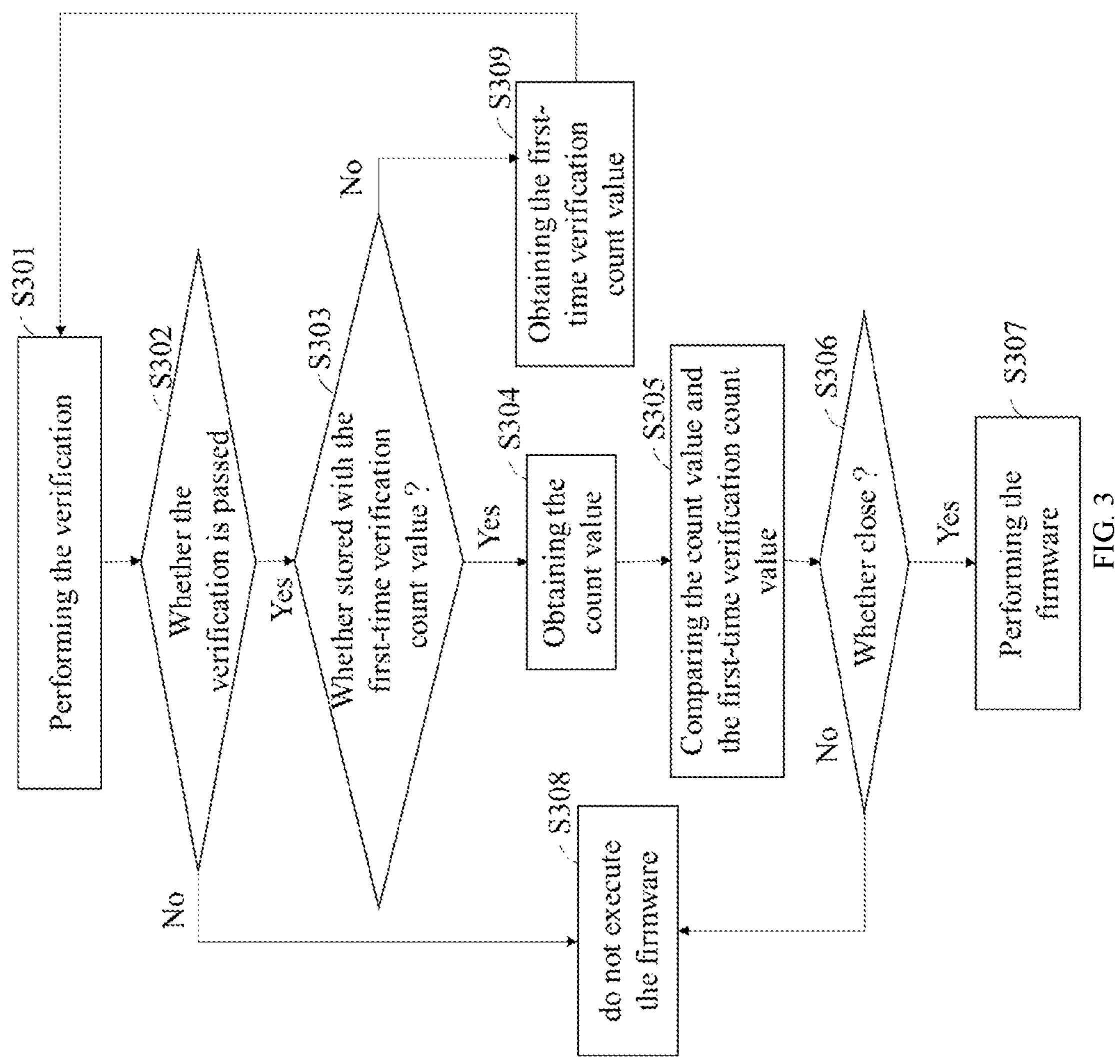
FIG. 3 is flowchart of a secure boot method according to an embodiment of the present disclosure.

Please refer to FIG. 3, FIG. 3 is flowchart of a secure boot method according to an embodiment of the present disclosure. The secure boot method of FIG. 3 may be implemented via the electronic system 1 of FIG. 1 or FIG. 2, and the secure boot method comprises the following steps. After the electronic system 1 starts, in step S301, the processor 11 reads the firmware 121 in the storage device 12 and performs the verification of the firmware 121. In step S302, the processor 11 determines whether the verification of the firmware 121 is passed. When the verification of the firmware 121 is passed, step S303 is proceeded. When the verification of the firmware 121 is not passed, step S308 is proceeded. In step S303, the processor 11 checks whether the storage device 14 stores the first-time verification count value 141 or the first-time verification count values 141 and 142. When the storage device 14 does not store the first-time verification count value 141 or the first-time verification count values 141 and 142, it means that the firmware 121 is verified by the processor 11 for the first time, and step S309 is proceeded. When the storage device 14 stores the first-time verification count value 141 or the first-time verification count values 141 and 142, it means that the firmware 121 is verified by the processor 11 for the non-first time, and step S304 is proceeded. In step S308, the processor 11 does not execute the firmware 121 to protect the security of the electronic system 1. It is noted that in this embodiment of FIG. 3, it is taken that the time taken by the processor 11 to perform the verification of the firmware 121 once for the non-first time as an example to described. In other embodiments, the steps in FIG. 3 can be modified to obtain the time that it takes for the firmware 121 to be verified more than twice for the non-first time.

In step S304, the comparator 15 obtains the count value, or the comparators 15 and 19 obtain the count values based on different frequencies. In step S309, the storage device 14 stores the first-time verification count value 141 or stores the first-time verification count values 141 and 142. In step S305, the comparator 15 compares the count value with the first-time verification count value 141. Alternatively, the comparator 15 compares the count value with the first-time verification count value 141, and the comparator 19 compares the count value with the first-time verification count value 142. In step S306, the processor 11 determines whether the count value is close to the first-time verification count value 141 based on the comparison result CMP1. Alternatively, the processor 11 determines whether the two count values are close to the first-time verification count values 141 and 142 based on the comparison results CMP1 and CMP2, respectively. When at least one of them is close to the first-time verification count value, step S307 is proceeded. Otherwise, step S308 is proceeded. In step S307, the processor 11 executes the firmware 121.

As stated as above, the embodiments of the present disclosure provides the secure boot device, the method and the electronic system using the same to confirm whether the electronic system is attacked or the firmware 121 is tampered with via detecting whether the time of the firmware verification varies during the boot process, so that the security of the electronic system is improved. Furthermore, in one of the embodiments, in order to avoid changing or abnormality of the system main frequency, the clock corresponding to the auxiliary frequency can be additionally utilized for another counting. Therefore, in additional to further confirm whether the system main frequency is abnormal, the robustness of the secure mechanism can also be improved.

It should be understood that the examples and embodiments described herein are for illustrative purpose only, and various modifications or changes in view thereof will be suggested to those skilled in the art, and will be included in the spirit and scope of the application and the appended within the scope of the claims.

What is claimed is:

1. A secure boot device, comprising:

a first counter, configured to receive a first clock, wherein when a processor performs a verification of a firmware for a first time, the first counter counts a first verification time taken by the processor to perform the verification of the firmware for the first time based on the first clock to generate a first first-time verification count value, and wherein when the processor performs the verification of the firmware for a non-first time, the first counter counts a second verification time taken by the processor to perform the verification of the firmware at least once for the non-first time based on the first clock to generate a first count value;

a first storage device, electrically connected to the first counter, and configured to store the first first-time verification count value; and a first comparator, electrically connected to the first counter and the first storage device, wherein when the processor performs the verification of the firmware for the non-first time, the first comparator compares the first count value with the first first-time verification count value and generates a first comparison result, and wherein the first comparison result is configured to indicate whether the processor executes the firmware.

2. The secure boot device according to claim 1, further comprising:

a first demultiplexer, electrically connected to the first counter, the first storage device and the first comparator, wherein the first demultiplexer determines to transmit the first first-time verification count value to the first storage device for storing, or to transmit the first count value to the first comparator based on a first-time verification instruction transmitted from the processor.

3. The secure boot device according to claim 1, further comprising:

a second counter, configured to receive a second clock, wherein when the processor performs the verification of the firmware for the first time, the second counter counts the first verification time taken by the processor to perform the verification of the firmware for the first time based on the second clock to generate a second first-time verification count value, wherein when the processor performs the verification of the firmware for the non-first time, the second counter counts the second verification time taken by the processor to perform the verification of the firmware for the non-first time based on the second clock to generate a second count value, and wherein the second first-time verification count value is stored in the first storage device; and a second comparator, electrically connected to the second counter and the first storage device, wherein when the processor performs the verification of the firmware for the non-first time, the second comparator compares the second count value with the second first-time verification count value, and generates a second comparison result, and wherein the second comparison result is configured to indicate whether the processor executes the firmware.

4. The secure boot device according to claim 3, further comprising:

a first demultiplexer, electrically connected to the first counter, the first storage device and the first comparator, wherein the first demultiplexer determines to transmit the first first-time verification count value to the first storage device for storing, or to transmit the first count value to the first comparator based on a first-time verification instruction transmitted from the processor; and a second demultiplexer, electrically connected the second counter, the first storage device and the second comparator, wherein the second demultiplexer determines to transmit the second first-time verification count value to the first storage device for storing, or to transmit the second count value to the second comparator based on the first-time verification instruction transmitted from the processor.

5. The secure boot device according to claim 3, wherein the first clock is corresponding to a system main frequency, and the second clock is corresponding to an auxiliary frequency.

6. An electronic system, comprising:

a secure boot device, comprising:

a first counter, configured to receive a first clock, wherein when a processor performs a verification of a firmware for a first time, the first counter counts a first verification time taken by the processor to perform the verification of the firmware for the first time based on the first clock to generate a first first-time verification count value, and wherein when the processor performs the verification of the firmware for a non-first time, the first counter counts a second verification time taken by the processor to perform the verification of the firmware at least once for the non-first time based on the first clock to generate a first count value;

a first storage device, electrically connected to the first counter, and configured to store the first first-time verification count value; and a first comparator, electrically connected to the first counter and the first storage device, wherein when the processor performs the verification of the firmware for the non-first time, the first comparator compares the first count value with the first first-time verification count value and generates a first comparison result, and wherein the first comparison result is configured to indicate whether the processor executes the firmware;

the processor; and a second storage device, electrically connected to the processor and the secure boot device, and configured to store the firmware.

7. The electronic system according to the claim 6, further comprising:

a first demultiplexer, electrically connected to the first counter, the first storage device and the first comparator, wherein the first demultiplexer determines to transmit the first first-time verification count value to the first storage device for storing, or to transmit the first count value to the first comparator based on a first-time verification instruction transmitted from the processor.

8. The electronic system according to the claim 6, further comprising:

a second counter, configured to receive a second clock, wherein when the processor performs the verification of the firmware for the first time, the second counter counts the first verification time taken by the processor to perform the verification of the firmware for the first time based on the second clock to generate a second first first-time verification count value, wherein when the processor performs the verification of the firmware for the non-first time, the second counter counts the second verification time taken by the processor to perform the verification of the firmware for the non-first time based on the second clock to generate a second count value, and wherein the second first-time verification count value is stored in the first storage device; and a second comparator, electrically connected to the second counter and the first storage device, wherein when the processor performs the verification of the firmware for the non-first time, the second comparator compares the second count value with the second first-time verification count value, and generates a second comparison result, and wherein the second comparison result is configured to indicate whether the processor executes the firmware.

9. The electronic system according to claim 8, further comprising:

a first demultiplexer, electrically connected to the first counter, the first storage device and the first comparator, wherein the first demultiplexer determines to transmit the first first-time verification count value to the first storage device for storing, or to transmit the first count value to the first comparator based on a first-time verification instruction transmitted to the processor; and a second demultiplexer, electrically connected the second counter, the first storage device and the second comparator, wherein the second demultiplexer determines to transmit the second first-time verification count value to the first storage device for storage, or to transmit the second count value to the second comparator based on the first-time verification instruction transmitted from the processor.

10. The electronic system according to claim 8, wherein the first clock is corresponding to a system main frequency, and the second clock is corresponding to an auxiliary frequency.

11. The electronic system according to claim 6, wherein the electronic system is a server, a game console, a smartphone, a tablet, a desktop computer, a notebook computer, a smart wearable device, a processing equipment or a reaction equipment.

12. A secure boot method, comprising:

counting a first verification time taken by a processor to perform a verification of a firmware for a first time based on a first clock to generate a first first-time verification count value, and storing the first first-time verification count value in a first storage device when the processor performs the verification of the firmware for the first time;

counting a second verification time taken by the processor to perform the verification of the firmware at least once for a non-first time based on the first clock to generate a first count value, comparing the first count value with the first first-time verification count value, and generating a first comparison result when the processor performs the verification of the firmware for the non-first time; and indicating whether the processor executes the firmware based on the first comparison result.

13. The secure boot method according to claim 12, further comprising:

counting the first verification time taken by the processor to perform the verification of the firmware for first time based on a second clock to generate a second first-time verification count value, and storing the second first-time verification count value in the first storage device when the processor performs the verification of the firmware for the first time;

counting the second verification time taken by the processor to perform the verification of the firmware for the non-first time based on the second clock to generate a second count value, comparing the second count value and the second first-time verification count value, and generating a second comparison result when the processor performs the verification of the firmware for the non-first time; and indicating whether the processor executes the firmware based on the first comparison result and the second comparison result.

14. The secure boot method according to claim 13, wherein the first clock is corresponding to a system main frequency, and the second clock is corresponding to an auxiliary frequency.

* * * * *